United States Patent
Bretschneider et al.

(10) Patent No.: US 12,085,747 B2
(45) Date of Patent: *Sep. 10, 2024

(54) LUMINAIRE HAVING A LIGHT GUIDE WITH CLADDING

(71) Applicant: Quarkstar LLC, Las Vegas, NV (US)

(72) Inventors: Eric Bretschneider, Corinth, TX (US); Ferdinand Schinagl, North Vancouver (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,669

(22) Filed: Jan. 18, 2023

(65) Prior Publication Data

US 2023/0408748 A1 Dec. 21, 2023

Related U.S. Application Data

(63) Continuation of application No. 16/969,482, filed as application No. PCT/US2019/017641 on Feb. 12, 2019, now Pat. No. 11,561,337.
(Continued)

(51) Int. Cl.
*F21V 8/00* (2006.01)

(52) U.S. Cl.
CPC ......... *G02B 6/0055* (2013.01); *G02B 6/0028* (2013.01); *G02B 6/0031* (2013.01); *G02B 6/0036* (2013.01); *G02B 6/0065* (2013.01)

(58) Field of Classification Search
CPC .................................................... F21V 7/0091
See application file for complete search history.

(56) References Cited

U.S. PATENT DOCUMENTS 4,914,665 A * 4/1990 Sorin .................. H01S 3/1055
372/20
5,927,850 A 7/1999 Osada
(Continued)

FOREIGN PATENT DOCUMENTS

EP 2821689 1/2015

OTHER PUBLICATIONS

International Application No. PCT/US2019/017641, Notification of Transmittal of the International Search Report and the Written Opinion of the Internatioanl Searching Authority, mailed Jul. 12, 2019, 15 pages.

*Primary Examiner* — Keith G. Delahoussaye
(74) *Attorney, Agent, or Firm* — Fish & Richardson P.C.

(57) ABSTRACT

A luminaire module includes light-emitting elements (LEEs) arranged to provide light; a light guide including a receiving end and an opposing end, the receiving end arranged to receive light provided by the LEEs, a core including a first transparent material with a first refractive index, the core having a pair of opposing side surfaces extending along a length of the light guide between the receiving and opposing ends, and a cladding including a second material having a second smaller refractive index, the cladding extending across and being in contact with at least a portion of the opposing side surfaces forming a cladding-core interface. The cladding-core interface is optically smooth. Additionally, the luminaire module includes an optical extractor arranged to receive guided light from the opposing end of the light guide and configured to output into the ambient environment at least some of the received guided light.

15 Claims, 8 Drawing Sheets

Related U.S. Application Data

(60) Provisional application No. 62/668,204, filed on May 7, 2018, provisional application No. 62/629,647, filed on Feb. 12, 2018.

(56) References Cited

U.S. PATENT DOCUMENTS

| | | |
|---|---|---|
| 2005/0135761 A1 | 6/2005 | Cannon |
| 2006/0227570 A1 | 10/2006 | Rutherford et al. |
| 2011/0182084 A1 | 7/2011 | Tomlinson |
| 2017/0045666 A1 | 2/2017 | Vasylyev |
| 2018/0027331 A1 | 10/2018 | Gahagan |

* cited by examiner

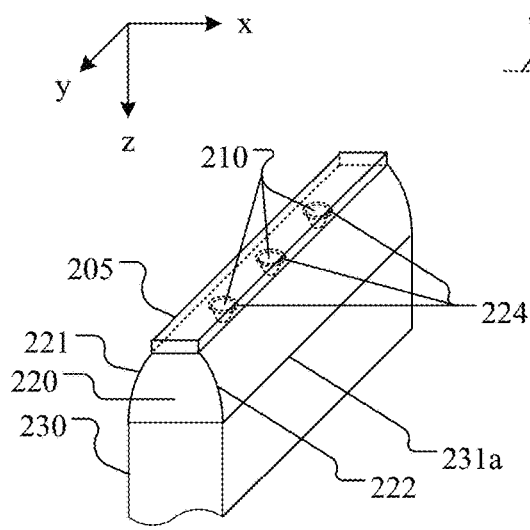
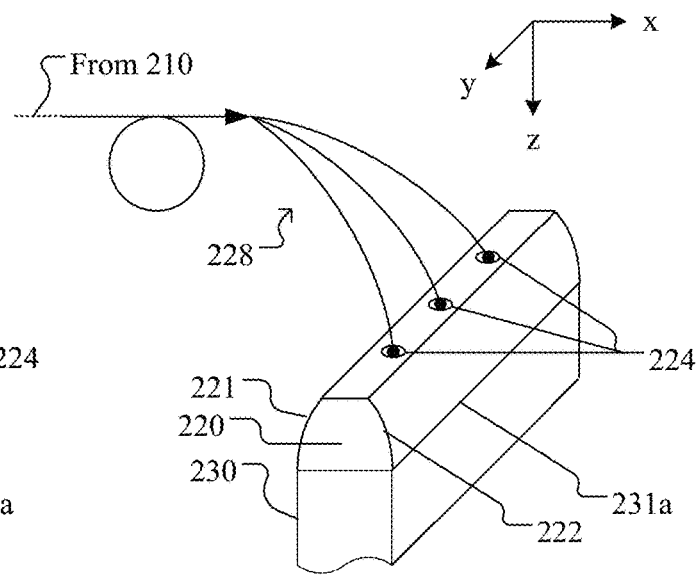
FIG. 2B
FIG. 2C
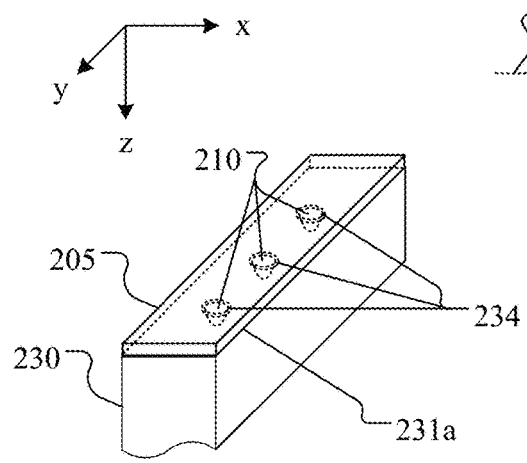
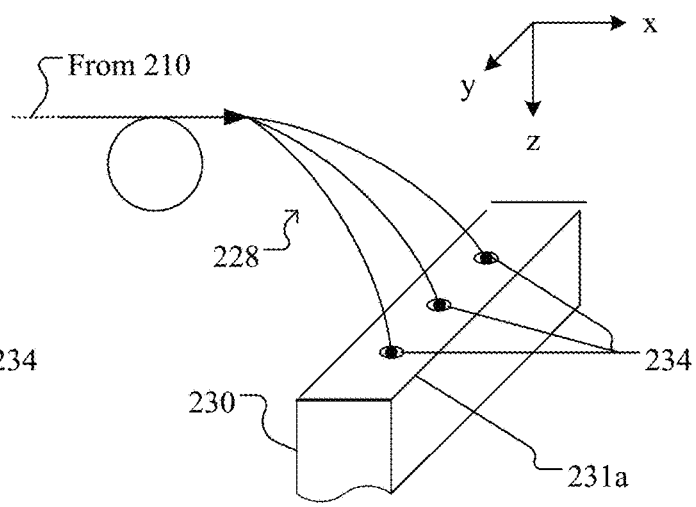
FIG. 2D
FIG. 2E

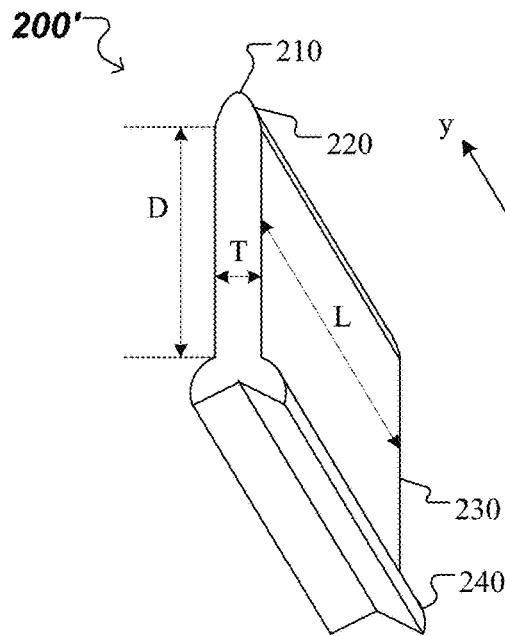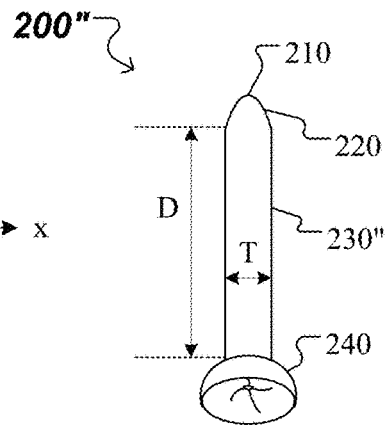
FIG. 2G
FIG. 2H
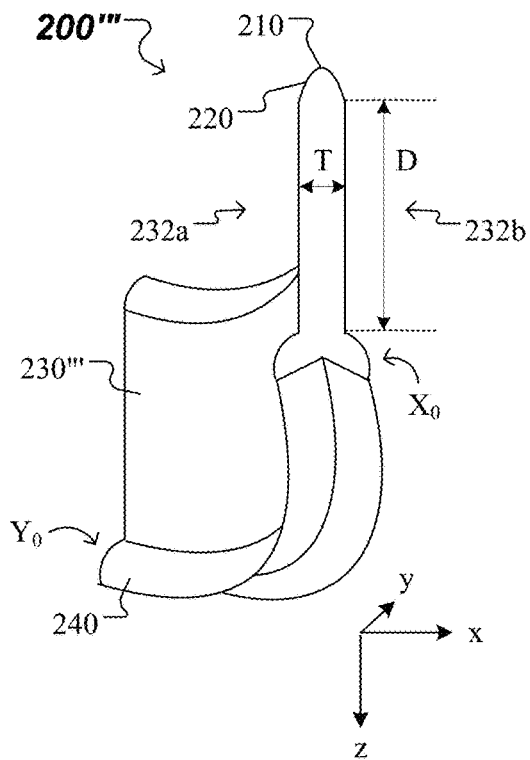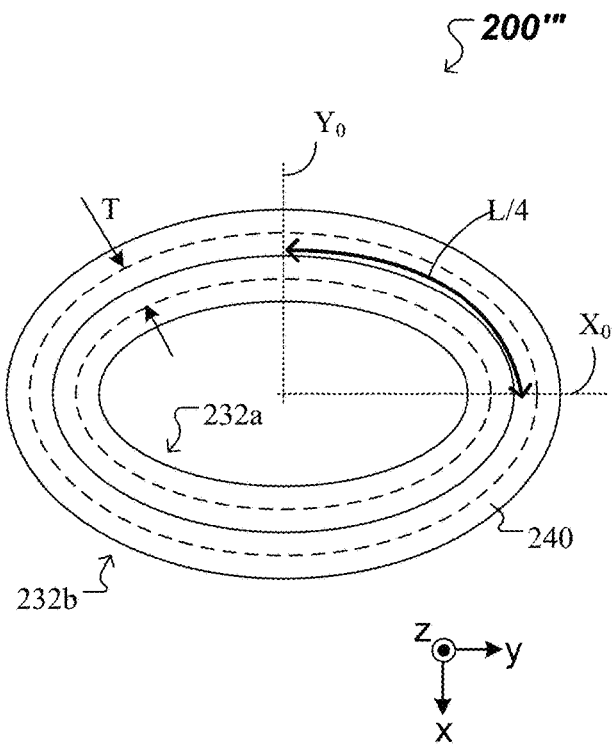
FIG. 2I
FIG. 2J

LUMINAIRE HAVING A LIGHT GUIDE WITH CLADDING

CROSS-REFERENCE TO RELATED APPLICATIONS

This application is a continuation of U.S. application Ser. No. 16/969,482, filed on Aug. 12, 2020, which is a U.S. national phase application of International Application No. PCT/US2019/017641, filed on Feb. 12, 2019, which claims benefit under 35 U.S.C. § 119(e)(1) of U.S. Provisional Application No. 62/629,647, filed on Feb. 12, 2018, and of U.S. Provisional Application No. 62/668,204, filed on May 7, 2018, all of which are incorporated by reference herein.

TECHNICAL FIELD

The present disclosure relates to luminaires having a light guide with cladding.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

The present disclosure relates to luminaires that include a light guide with cladding.

In general, innovative aspects of the technologies described herein can be implemented in a luminaire that includes one or more of the following aspects:

In one aspect, a luminaire includes a) one or more light-emitting elements (LEEs) arranged to provide light; and b) a light guide including a receiving end and an opposing end, the receiving end arranged to receive light provided by the LEEs. The light guide also includes a core including a first transparent material with a first refractive index, the core having a pair of opposing side surfaces extending along a length of the light guide between the receiving end and the opposing end. Additionally, the light guide includes a cladding including a second material having a second refractive index smaller than the first refractive index, the cladding extending across and being in contact with at least a portion of the opposing side surfaces forming a cladding-core interface. The cladding-core interface is optically smooth. Also, the light guide is configured to guide at least some of the received light in a forward direction through total internal reflection (TIR) toward the opposing end of the light guide. Additionally, the luminaire includes c) an optical extractor arranged to receive guided light from the opposing end of the light guide and configured to output into the ambient environment at least some of the received guided light.

The foregoing and other embodiments can each optionally include one or more of the following features, alone or in combination. In some implementations, the cladding can extend from the receiving end to the opposing end. In some implementations, the cladding can be transparent. In some implementations, a thickness of the cladding can be larger than an evanescent wave depth. In some implementations, a wall at an edge of the cladding can form an acute angle with a corresponding one of the pair of opposing side surfaces. In some implementations, a thickness of the cladding can increase toward the opposing end.

In some implementations, the light provided by the LEEs is in a first angular range, and a divergence 2θ of the first angular range and a relative refractive index $n_2/n_1$ for guided light at the cladding-core interface satisfy the following condition $$2\theta \le 2\left(\frac{\pi}{2} - \arcsin\left(\frac{n_2}{n_1}\right)\right).$$

In some implementations, the luminaire can include one or more optical couplers. Here, the light provided by the LEEs is in a first angular range. The optical couplers are arranged to receive the light provided by the LEEs and redirect it to the receiving end of the light guide in a second angular range, and a divergence 2θ of the second angular range and a relative refractive index $n_2/n_1$ for guided light at the cladding-core interface satisfy the following condition $$2\theta \le 2\left(\frac{\pi}{2} - \arcsin\left(\frac{n_2}{n_1}\right)\right).$$

In some implementations, the cladding can be contiguous. In some implementations, the core and the cladding can be integrally formed. In some implementations, the cladding can directly adhere to the core. In some implementations, the luminaire can include an adhesive adhering the cladding and the core. In some implementations, the cladding can have a uniform refractive index.

In another aspect, a light guide includes a receiving end and an opposing end, the receiving end arranged to receive light provided by one or more LEEs; a core including a first transparent material with a first refractive index, the core having a pair of opposing side surfaces extending between the receiving end and the opposing end; and a cladding including a solid film and a layer of adhesive viscous material sandwiched between the film and the core, the viscous material having a second refractive index, the cladding arranged across at least a portion of one of the opposing side surfaces. The core and the cladding are configured to guide at least some of the received light in a forward direction through total internal reflection (TIR) toward the opposing end of the light guide.

The foregoing and other embodiments can each optionally include one or more of the following features, alone or in combination. In some implementations, the opposing side surfaces can be optically smooth, and the second refractive index is smaller than the first refractive index. In some implementations, the opposing side surfaces are optically rough, the second refractive index matches the first refractive index, and the solid film has a third refractive index smaller than the second refractive index.

In another aspect, a luminaire includes a) one or more light-emitting elements (LEEs) arranged to provide light;

and b) a light guide including a receiving end and an opposing end, the receiving end arranged to receive the light provided by the LEEs, the light guide configured to guide received light in a forward direction, through total internal reflection (TIR), along the length of the light guide toward the opposing end of the light guide. The light guide also includes a core including a transparent core material with a first refractive index, the core having a pair of opposing, optically rough side surfaces extending along a length of the light guide between the receiving end and the opposing end. Additionally, the light guide includes a first cladding including a transparent first cladding material having a refractive index matching the first refractive index of the core material, the first cladding arranged onto the optically rough side surfaces between the receiving end and the opposing end. Additionally, the luminaire includes c) an optical extractor located at the opposing end and configured to output into the ambient environment the guided light as output light in backward directions.

The foregoing and other embodiments can each optionally include one or more of the following features, alone or in combination. In some implementations, the light guide can include a second cladding including a second cladding material, the second cladding material having a second refractive index smaller than the first refractive index of the core material, the second cladding arranged onto the first cladding over at least a portion of a core length measured between the receiving end and the opposing end.

In some implementations, a thickness of the first cladding can be larger than an rms measure of roughness of the optically rough first cladding-core interface. For instance, the thickness of the cladding is in a range of 3×rms to 6×rms.

In some implementations, the light provided by the LEEs is in a first angular range, and a divergence 2θ of the first angular range and a relative refractive index $n_2/n_1$ for guided light at the air-cladding interface satisfy the following condition $$2\theta \le 2\left(\frac{\pi}{2} - \arcsin\left(\frac{1}{n_2}\right)\right),$$

when the refractive index of the transparent first cladding material matches the first refractive index of the core material $n_2 \approx n_1$.

In some implementations, the luminaire can include one or more optical couplers. The light provided by the LEEs is in a first angular range. Here, the optical couplers are arranged to receive the light provided by the LEEs and redirect it to the receiving end of the light guide in a second angular range. Also, a divergence of the second angular range and a relative refractive index for guided light at the air-cladding interface satisfy the following condition $$2\theta \le 2\left(\frac{\pi}{2} - \arcsin\left(\frac{1}{n_2}\right)\right),$$

when the refractive index of the transparent first cladding material matches the first refractive index of the core material $n_2 \approx n_1$.

In either of the foregoing implementations, the pair of opposing side surfaces of the core can be parallel. In some cases, the pair of opposing side surfaces of the core are planar. In either of the foregoing implementations, the LEEs can be LEDs that emit white light.

In either of the foregoing implementations, the optical extractor can include at least one redirecting surface. Here, the at least one redirecting surface of the optical extractor is adapted to reflect at least a portion of the guided light in a direction that has a component orthogonal to the forward direction.

In either of the foregoing implementations, the optical extractor can include a first redirecting surface adapted to reflect at least a portion of the guided light in a first direction that has a component orthogonal to the forward direction; and a second redirecting surface adapted to reflect at least a portion of the guided light in a second direction that has a component orthogonal to the forward direction and antiparallel to the first direction.

In either of the foregoing implementations, the luminaire can include one or more optical fibers arranged between, and configured to optically couple, the input end of the light guide and the LEEs.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE DRAWINGS

FIGS. 2A-2J show aspects of example luminaire modules that include a light guide without cladding.

Figure 1A:
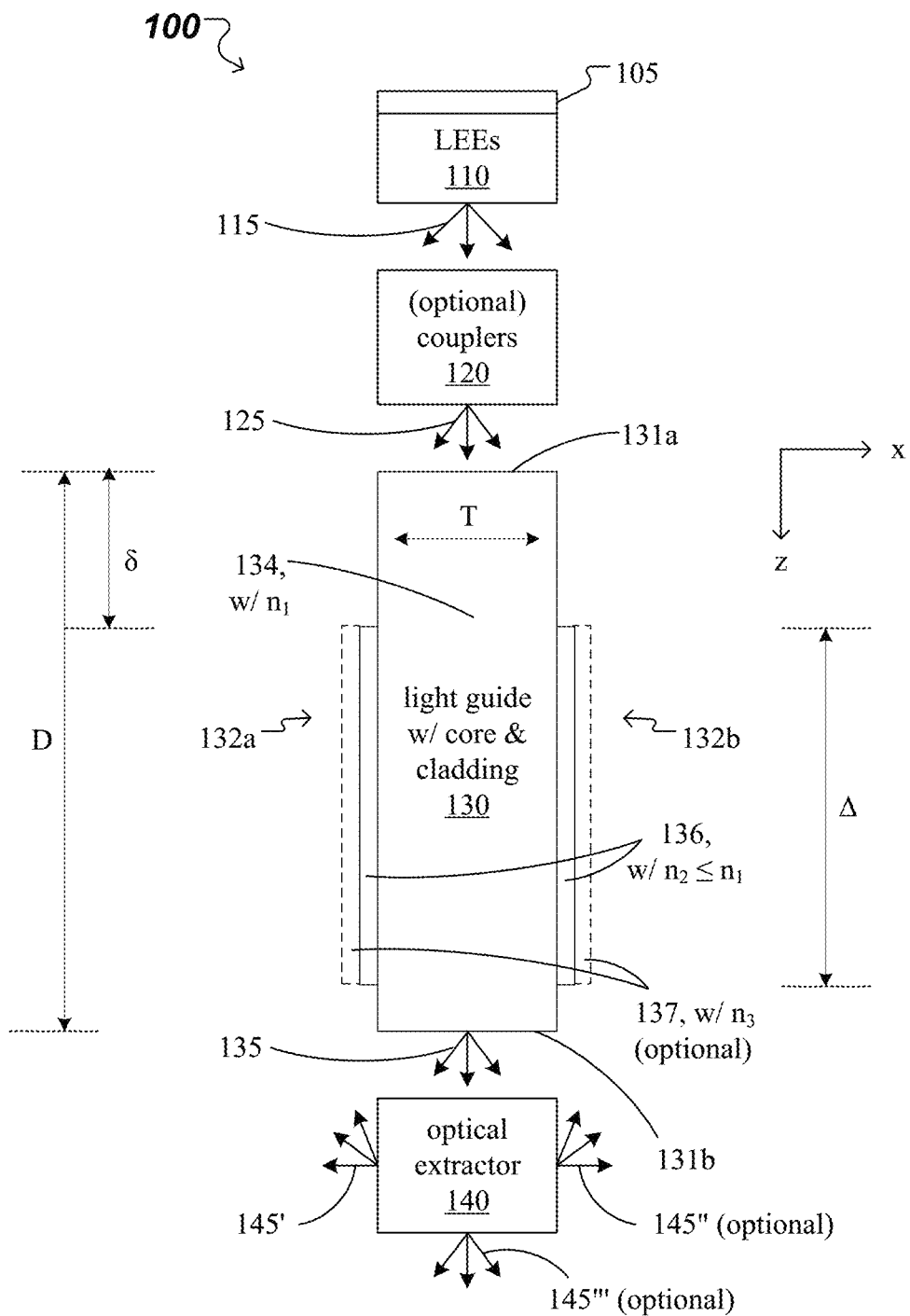
FIG. 1A shows an example of a luminaire module that includes a light guide with a core and a cladding.

Reference numbers and designations in the various drawings indicate example aspects of implementations of particular features of the present disclosure.

DETAILED DESCRIPTION

The present disclosure relates to luminaires for providing direct and/or indirect illumination. The disclosed luminaires can efficiently guide and distribute light emitted by solid-state light sources towards work surfaces and/or towards background regions. The light from the solid-state light sources is received at an input end of a light guide and guided along a length thereof to an output end of the light guide. The light guide includes a light guide core and a cladding having a refractive index smaller than or equal to the one of the core. The cladding is arranged on one or more surfaces of the light guide and encapsulates at least a portion of the core on the one or more surfaces. For example, the cladding extends over at least a fraction of the length of the light guide. Depending on the implementation, the guided light can be output from the output end of the light guide by an optical extractor coupled to the light guide.

(I) Provision of Cladding

Claddings can be provided in a number of ways which may affect the detailed workings and structure of the corresponding light guide. Claddings can be formed during or in effect of manufacture of a core or applied after manufacture of a core. Claddings, cores or the combined cladded light guide may be transparent, translucent, or partially or fully opaque. Claddings may be formed directly on a core during or after core manufacture via spray coating, vapor, chemically induced or physically induced deposition, or applied as a film, or combinations thereof. Claddings may be formed as a result of chemical reactions on top, in, or below respective surfaces of the core. For example, slabs of glass such as Gorilla Glass™ may provide a refractive index profile suitable for optical confinement for the instant technology in effect of specific annealing and/or other processing during manufacture.

Claddings may comprise organic, inorganic or both organic and inorganic compounds and include one or more layers of different materials or material modifications forming one or more sandwiched layers providing discrete or substantially gradual variations in refractive indices. Claddings may be configured to confine light of certain wavelengths or specific wavelength intervals to the core. Cladded light guides can also be provided as a result of regular or irregular arrangements of bundles or superlattices of smaller light guides or optical components and may comprise engineered negative optical index materials, for example.

Claddings that are pre-formed as films and applied to the core post manufacturing may be self-adhesive or applied to the core via a separate adhesive. In the latter case, optical confinement may be provided by the adhesive. As such, films may be employed that on their own do not necessarily provide optical confinement but rather act as a protective film for the adhesive sandwiched between the film and the core. Such implementations may allow viscous substances to be used to provide optical confinement of guided light in the core.

(II) Luminaire Having a Light Guide with Cladding

FIG. 1A illustrates a block diagram of a luminaire 100 that includes a light guide 130 with a light guide core 134 and a cladding 136 which encapsulates, at least in part, the core. The luminaire 100, referred to as luminaire module 100, also includes a substrate 105, one or more light emitting elements (LEEs) 110 and an optical extractor 140. In some implementations, the luminaire 100 further includes one or more couplers 120.

In general, a LEE, also referred to as a light emitter, is a device that emits radiation in one or more regions of the electromagnetic spectrum from among the visible region, the infrared region and/or the ultraviolet region, when activated. Activation of a LEE can be achieved by applying a potential difference across components of the LEE or passing a current through components of the LEE, for example. A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. In some implementations, a LEE is a specific device that emits the radiation, for example a LED die. In other implementations, the LEE includes a combination of the specific device that emits the radiation (e.g., a LED die) together with a housing or package within which the specific device or devices are placed. Examples of LEEs include also lasers and more specifically semiconductor lasers, such as vertical cavity surface emitting lasers (VCSELs) and edge emitting lasers. Further examples of LEEs include superluminescent diodes and other superluminescent devices.

During operation, the LEEs 110 provide light within a first angular range 115. Such light can have a Lambertian distribution relative to the optical axes of the one or more LEEs 110 (e.g., the z-axis of the Cartesian reference system shown in FIG. 1A.) As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. (See, e.g., FIG. 1C.) Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

Referring again to FIG. 1A, the light guide 130 is arranged to receive the light provided by the LEEs 110 at one end 131a and to guide the received light in a forward direction, e.g., along the z-axis, from the receiving end 131a to an opposing end 131b. Here, a distance D between the receiving end 131a and its opposing end 131b can be 5, 10, 20, 50 or 100 cm, for instance.

The core 134 of light guide 130 is made from a first solid material that is transparent to the light received from the LEEs 110 and has a first refractive index $n_1$. The core 134 extends, over the distance D, from the receiving end 131a of the light guide 130 to the opposing end 131b of the light guide, and has one or more side surfaces 132a, 132b. Generally, surfaces of the light guide can be planar, curved or otherwise shaped. In the example shown in FIG. 1A, the side surfaces 132a and 132b of the light guide 130 of the luminaire module 100 are parallel to each other.

The cladding 136 of light guide 130 is arranged on the one or more side surfaces 132a, 132b of the core 134 and is formed from a second material with a second refractive index $n_2$ smaller than or equal to the first refractive index $n_1$. In some implementations, the cladding material is transparent.

The cladding 136 can be applied to the core 134 in different ways as noted herein. In some implementations, the cladding 136 can be formed by (i) forming a film with suitable self-adhesive properties, or applying an adhesive film, on the side surfaces 132a, 132b of the core, and then (ii) immersion coupling the cladding 136 to the previously formed/applied films. In some implementations, the cladding 136 can be formed by directly (in-situ) coating the core 134 or otherwise. For example, the cladding 136 can be sprayed, dipped or otherwise coated from a solution or emulsion. In-situ formed cladding 136, be it by spraying or otherwise, may not require an additional adhesive and can be easily applied to curved surfaces of the core.

For instance, the cladding 136 can be formed from a solid film and a layer of adhesive viscous material sandwiched between the film and the core 134. Here, the viscous material has a second refractive index $n_2 \leq n_1$, and the solid film has a third refractive index $n_3$. In cases when the second refractive index of the viscous material is smaller than the first refractive index of the core 134, $n_2 < n_1$, the third refractive index of the solid film can be smaller than, equal to, or larger than, the second refractive index of the viscous material. However, in cases when the second refractive index of the viscous material matches the first refractive index of the core 134, $n_2 \approx n_1$, the third refractive index of the solid film is smaller than the second refractive index of the viscous material $n_3 < n_2$.

Moreover, the cladding 136 is arranged over a portion of length Δ of the one or more side surfaces 132a, 132b, such that Δ=100%, 90%, 80%, 70%, 60%, 50%, 40%, 30%, 20%, 10% of D, or other fractions of D. As such, the cladding 136 can extend, over the length Δ, on the one or more side surfaces 132a, 132b starting at a distance δ from the receiving end 131a, such that δ=0 or 10%, 20%, 30%, 40%, 50%, 60%, 70%, 80%, 90% of D, or other fractions of D. In this manner, the one or more side surfaces 132a, 132b of the core 134 interface with the cladding 136 over a length Δ, starting at a distance δ from the receiving end 131a and ending at a distance (D−Δ−δ) from the opposing end 131b. Here, the one or more side surfaces 132a, 132b of the core 134 interface with the environment (e.g., with air) over a distance δ adjacent to the receiving end 131a and over a distance (D−Δ−δ) adjacent to the opposing end 131b.

In some implementations the cladding can have openings, have gaps, include multiple non-contiguous portions or be otherwise arranged. The cladding 136 can also extend beyond the light guide onto the couplers 120, if present, and/or optical extractor 140. Likewise, some surfaces of the couplers 120 and/or the optical extractor 140 can be equipped with a cladding.

Figure 1B:
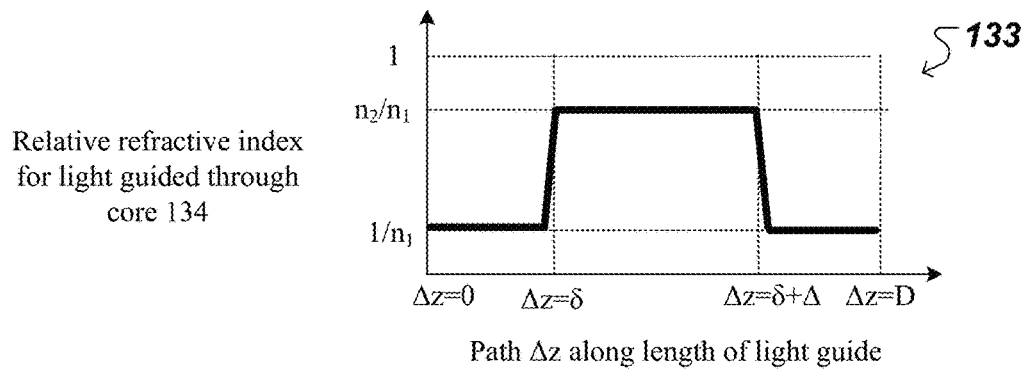
FIG. 1B shows the relative refractive index for light guided through a light guide of the luminaire module shown in FIG. 1A along the length of the light guide in z-direction.

FIG. 1B is a graph of a profile 133 of the relative refractive index experienced, at the one or more side surfaces 132a, 132b, by the light guided by the core 134 over a path along the length D of the light guide 130 (in z-direction). As such, when the one or more side surfaces 132a, 132b represent an external interface of the core 134 with the environment (here, assumed to be air), the guided light experiences a relative refractive index=$1/n_1$. However, when the one or more side surfaces 132a, 132b represent an internal (i.e., unexposed to the environment) interface of the core 134 with the cladding 136, the guided light experiences a relative refractive index=$n_2/n_1$. Because $1 < n_2 \leq n_1$, the relative refractive index at the cladding-core interface is larger than the relative refractive index at the air-core interface, which causes a critical angle arcsin ($n_2/n_1$) at the cladding-core interface to be larger than the critical angle arcsin($1/n_1$) at the air-core interface. As such, for a given divergence 2θ of the angular range 115, in which light is received from the LEEs 110, the core 134 will guide light, from the receiving end 131a in the forward direction to the opposing end 131b, through total internal reflection (TIR) off of the side surfaces 132a, 132b, if the relative refractive index $n_2/n_1$ satisfies the condition $$\frac{n_2}{n_1} \leq \sin\left(\frac{\pi}{2} - \theta\right). \quad (1)$$

Alternatively, for a given relative refractive index $n_2/n_1$ at the cladding-core interface, the core 134 will guide light, from the receiving end 131a in the forward direction to the opposing end 131b, through TIR off of the side surfaces 132a, 132b, if the divergence 2θ of the angular range 115, in which light is received from the LEEs 110, is smaller than twice the complement of the critical angle at the cladding-core interface $$2\theta \leq 2\left(\frac{\pi}{2} - \arcsin\left(\frac{n_2}{n_1}\right)\right). \quad (2)$$

For certain ways of providing to the receiving end 131a the light from the LEEs 110, the divergence of the angular range 115 may not be low enough to satisfy the above-noted threshold TIR conditions (1) and (2). In such cases, the light within the angular range 115 may be collimated. Depending on the implementation, the luminaire module 100 can include one or more couplers 120 to receive the light from the LEEs 110 within the first angular range 115 and provide light within a second angular range 125 to the receiving end 131a of the light guide 130, as shown in FIG. 1A. The one or more couplers 120 are shaped to transform the first angular range 115 into the second angular range 125 via total internal reflection, specular reflection or both. As such, the one or more couplers 120 can include a solid transparent material for propagating light from an input end to an output end of each of the one or more couplers 120. Here, the divergence of the second angular range 125 is smaller than the divergence of the first angular range 115, such that all light provided by the couplers 120 in the angular range 125 can be injected into the core 134 at the receiving end 131a of the light guide 130, based on the above-noted TIR conditions (1) and (2).

Further details of implementations in which the side surfaces 132a, 132b of the core 134 are optically smooth to allow for the guided light to propagate inside the core through TIR are described in detail below in connection with FIGS. 3A-3B. Generally, the cladding 136 can have different or like refractive index compared to the core 134.

Aside from the above-described effects of a cladding 136 with a lower refractive index than the core 134, a cladding 136 with like refractive index can aid in manufacturing. For example, spray coating the side surfaces 132a, 132b of the core 134 to form a film of like refractive index can bury surface imperfections (generated, e.g., by machining or injection molding) and provide a smoother, optically better performing outer surface. Such outer surface can then be with the ambient environment, another cladding with lower refractive index or otherwise. In other implementations described in detail below in connection with FIGS. 4A-4B, the core 134's side surfaces 132a, 132b can be optically rough, such that TIR would be frustrated if the side surfaces were external surfaces in direct contact with the air. In such implementations, the cladding 136 can be arranged on the entire length of the core 134, Δ=D, and the cladding's refractive index $n_2$ is chosen to match the core's refractive index $n_1$, so no reflections occur at the optically rough cladding-core interface. In the latter implementations, the outside surface(s) of the cladding is(are) configured to be optically smooth, so light can be guided through the light guide 130 through TIR. Generally, coatings or claddings with like refractive index also can be used to fabricate optically smooth surfaces of other optical components—be it in the instant or other luminaires.

In some of the cases for which the second refractive index of the cladding 136 matches the first refractive index of the core, $n_2 \approx n_1$, the light guide 130 can optionally have an outer cladding 137 which encapsulates, at least in part, the inner cladding 136 disposed directly on the core 134. Here, the outer cladding 137 has a third refractive index $n_3$ smaller than the second refractive index $n_2$ of the inner cladding 136, $n_3 \leq n_2$. This embodiment corresponds to a case in which an "effective core", formed from optical components—here the optically rough core 134 cladded with the inner cladding 136—having matching refractive indices, is being cladded by the outer cladding 137 having a refractive index $n_3$ smaller than effective core's refractive index $n_1$.

Referring again to the general functionality of the luminaire 100 shown in FIG. 1A, provided there are no substantial light losses in the cladded portion of the light guide and because the core 134's side surfaces 132a, 132b are parallel to each other, a third angular range 135 of the guided light at the opposing end 131b of the light guide 130 has at least substantially the same divergence as the angular range 115 (when the light guide 130 receives the light directly from the LEEs 110) or 125 (when the light guide 130 receives the light directly from the couplers 120) of the light received at the receiving end 131a.

Additionally, the length D (along the z-axis), a width L (along the y-axis) and a thickness T (along the z-axis) of the core 134 are designed to homogenize the light provided by the LEEs 110—in a discrete manner along the y-axis at the receiving edge 131a of the light guide 130—as it is guided from the receiving end to the opposing end 131b of the light guide. In this manner, the homogenizing of the provided light—as it is guided through core 134—causes a change of a discrete profile along the y-axis of the first angular range 115 (when the light guide 130 receives the light directly from the LEEs 110) or the second angular range 125 (when the light guide 130 receives the light from the couplers 120) to a more uniform or continuous profile along the y-axis of the third angular range 135 in which the discrete profile is partially or fully blurred.

The optical extractor 140 outputs into the ambient environment the light received from the light guide 130 in one or more output illumination distributions in forward, backward or both forward and backward directions. As such, the light output by the extractor 140 has a first output angular range 145' that can be substantially continuous along the y-axis and has a first output propagation direction with a component opposite to the forward direction (e.g., antiparallel to the z-axis.) In some implementations, the light output by the extractor 140 has, in addition to the first output angular range 145', a second output angular range 145" that is substantially continuous along the y-axis and has a second output propagation direction with a component opposite to the forward direction (e.g., antiparallel to the z-axis.) In this case, the first output propagation direction and the second output propagation direction have respective components orthogonal to the forward direction that are opposite (antiparallel) to each other (antiparallel and parallel to the x-axis.) In some implementations, the light output by the extractor 140 has, in addition to the first output angular range 145' and the second output angular range 145", a third output angular range 145'" that can be substantially continuous along the y-axis and has a third output propagation direction along the forward direction (e.g., along the z-axis).

As described above, the light guide 130 and the optical extractor 140 of luminaire 100 are arranged and configured to translate and redirect light emitted by LEEs 110 away from the LEEs before the light is output into the ambient environment. The spatial separation of the place of generation of the light, also referred to as the physical (light) source, from the place of extraction of the light, also referred to as a virtual light source or a virtual filament, can facilitate design of the luminaire 100. In this manner, a virtual filament can be configured to provide substantially non-isotropic light emission with respect to planes parallel to an optical axis of the luminaire (for example the z-axis.) In contrast, a typical incandescent filament generally emits substantially isotropically distributed amounts of light. The virtual filament(s) may be viewed as one or more portions of space from which substantial amounts of light appear to emanate. Furthermore, separating the LEEs 110, with their predetermined optical, thermal, electrical and mechanical constraints, from the place of light extraction, may facilitate a greater degree of design freedom of the luminaire 100 and allows for an extended optical path, which can permit a predetermined level of light mixing before light is output from the luminaire 100.

Figure 1C:
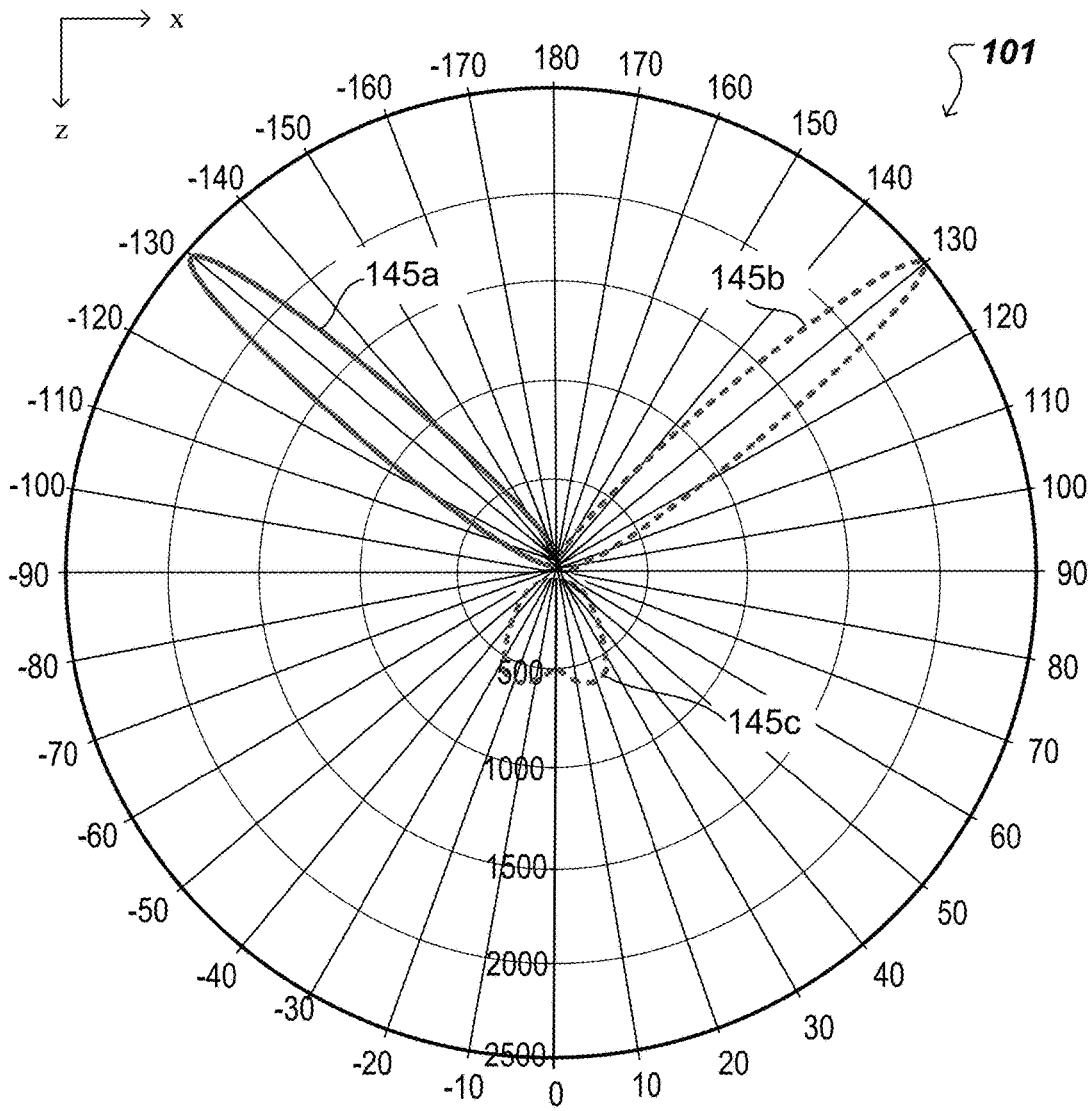
FIG. 1C is an intensity profile of the luminaire module shown in FIG. 1A.

FIG. 1C shows an x-z cross-section of far-field light intensity profile 101 of the luminaire 100 that is elongated along the y-axis (perpendicular to the sectional plane of FIG. 1A). In some implementations, the far-field light intensity profile 101 includes a first output lobe 145a representing light output by the luminaire 100 in the first output angular range 145'. In this case, a propagation direction of the first output angular range 145' is along the about −130° bisector of the first output lobe 145a. A divergence of the first output angular range 145' is represented by a width of the first output lobe 145a.

In some implementations, in addition to the first output lobe 145a, the far-field light intensity profile 101 includes one or more of a second output lobe 145b representing light output by the luminaire 100 in the second output angular range 145", or a third output lobe 145c representing light output by the luminaire 100 in the third output angular range 145'". In this case, a propagation direction of the second output angular range 145" is along the about +130° bisector of the second output lobe 145b, and a propagation direction of the third output angular range 145'" is along the about 0° bisector of the third output lobe 145c. Further in this case, a divergence of the second output angular range 145" (represented by a width of the second output lobe 145b) is about equal to the divergence of the first output angular range 145' and both of the foregoing divergences are smaller than the divergence of the third output angular range 145'" (represented by a width of the third output lobe 145c). In some implementations, light may be output only in forward (z) direction and as such only output lobe 145c may be present.

As described in detail below, composition and geometry of at least (i) the couplers 120, (ii) the light guide 130 with its core 134 and cladding 136, and (iii) the extractor 140 of the luminaire 100 can affect the far-field light intensity profile 101, e.g., the propagation direction and divergence associated with the first output lobe 145a, and, optionally, of the one or more of the second 145b and third 145c output lobes.

Prior to describing details of various embodiments of the luminaire 100 that include light guides with cladding, an example light guide luminaire is described for which the light guide has no cladding.

(III) Luminaire Module Having a Light Guide without Cladding

Figure 2A:
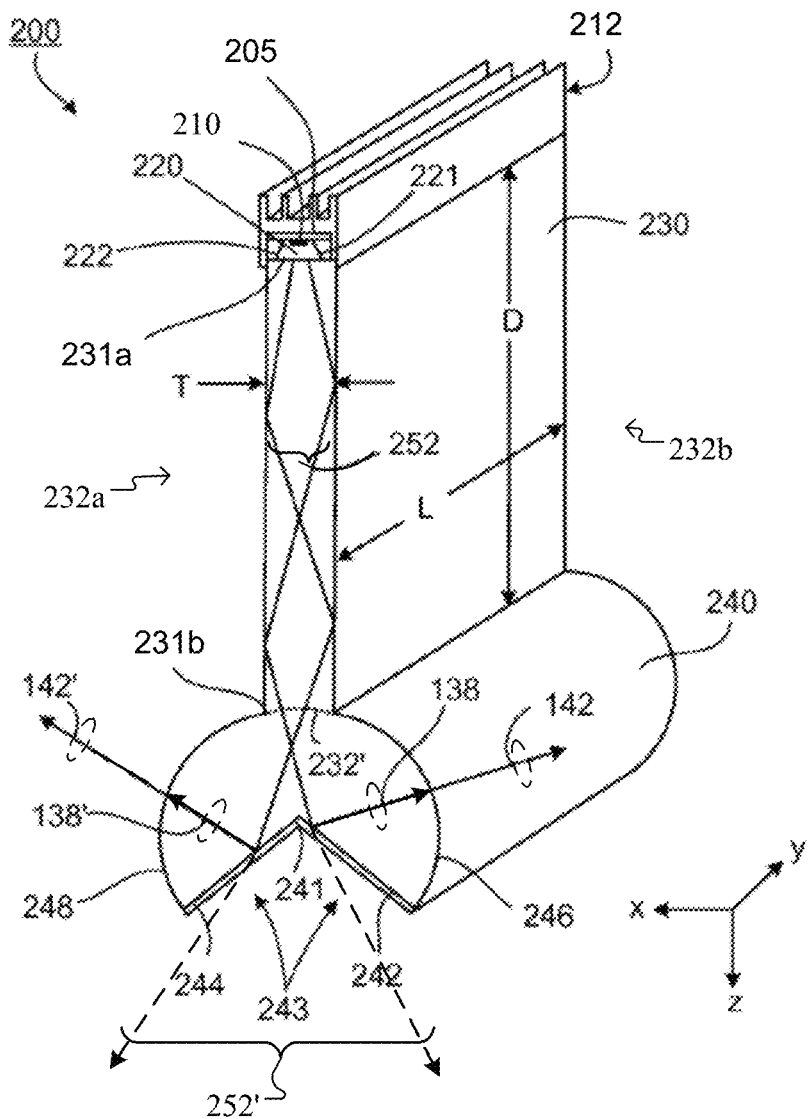

Referring to FIG. 2A, in which a Cartesian coordinate system is shown for reference, a luminaire module 200 includes a mount 205 (also referred to as a substrate) having a plurality of LEEs 210 distributed along a first surface of the mount. The mount 205 with the LEEs 210 is disposed at a first (e.g., upper) edge 231a of a light guide 230. Once again, the positive z-direction is referred to as the "forward" direction and the negative z-direction is the "backward" direction. Sections through the luminaire module 200 parallel to the x-z plane are referred to as the "cross-section" or "cross-sectional plane" of the luminaire module. Also, luminaire module 200 extends along the y-direction, so this direction is referred to as the "longitudinal" direction of the luminaire module. Implementations of luminaire modules can have a plane of symmetry parallel to the y-z plane, be curved or otherwise shaped. This is referred to as the "symmetry plane" of the luminaire module. Referring now to both FIGS. 2A and 2B, multiple LEEs 210 are disposed on the first surface of the mount 205. For example, the plurality of LEEs 210 can include multiple white LEDs. The LEEs 210 are optically coupled with one or more optical couplers 220. An optical extractor 240 is disposed at second (e.g., lower) edge 231b of light guide 230.

Mount 205, light guide 230, and optical extractor 240 extend a length L along the y-direction, so that the luminaire module is an elongated luminaire module with an elongation of L that may be about parallel to a wall of a room (e.g., a ceiling of the room). Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, or, 150 cm or more).

The number of LEEs 210 on the mount 205 will generally depend, inter alia, on the length L, where more LEEs are used for longer luminaire modules. In some implementations, the plurality of LEEs 210 can include between 10 and 1,000 LEEs (e.g., about 50 LEEs, about 100 LEEs, about 200 LEEs, about 500 LEEs). Generally, the density of LEEs (e.g., number of LEEs per unit length) will also depend on the nominal power of the LEEs and illuminance desired from the luminaire module. For example, a relatively high density of LEEs can be used in applications where high illuminance is desired or where low power LEEs are used. In some implementations, the luminaire module 200 has LEE density along its length of 0.1 LEE per centimeter or more (e.g., 0.2 per centimeter or more, 0.5 per centimeter or more, 1 per centimeter or more, 2 per centimeter or more). The density of LEEs may also be based on a desired amount of mixing of light emitted by the multiple LEEs. In implementations, LEEs can be evenly spaced along the length, L, of the luminaire module. In some implementations, a heat-sink 212 can be attached to the mount 205 to extract heat emitted by the plurality of LEEs 210, e.g., as illustrated in FIG. 2A. The heat-sink 212 can be disposed on a surface of the mount 205 opposing the side of the mount 205 on which the LEEs 210 are disposed. The luminaire module 200 can include one or multiple types of LEEs, for example one or more subsets of LEEs in which each subset can have different color or color temperature.

Referring again to both FIGS. 2A and 2B, in some implementations, optical coupler 220 includes one or more solid pieces of transparent optical material (e.g., a glass material or a transparent organic plastic, such as polycarbonate or acrylic). Here, the LEEs 210 are optically coupled with the optical coupler 220 through respective input apertures such as multiple discrete indentations 224 of the one or more solid pieces of transparent optical material, the indentations 224 being distributed along the y-axis. In other implementations, optical coupler 220 includes one or more hollow reflectors. Here, the LEEs 210 are optically coupled with the optical coupler 220 through respective openings 224 the one or more hollow reflectors, the openings 224 being distributed along the y-axis. In the example implementation illustrated in FIG. 2C, the LEEs 210 are spaced apart from the optical coupler 220, such that the light emitted by the LEEs 210 is provided to the optical coupler 220 through multiple optical fibers 228. Here, a respective output tip of each of the optical fibers 228 delivers light emitted by the LEEs 210 to a respective indentation 224 of each of the solid pieces of transparent optical material of the optical coupler 220 or a respective opening 224 of each of the hollow reflectors of the optical coupler 220. In some implementations, the multiple discrete indentations 224 may be replaced with one contiguous indentation extending along the y-direction.

Referring now to all of FIGS. 2A-2C, each of the pieces of transparent optical material of the optical coupler 220 or each of the hollow reflectors of the optical coupler 220 has surfaces 221 and 222 positioned to reflect light from the LEEs 210 towards the light guide 230. In general, surfaces 221 and 222 are shaped to collect and at least partially collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some implementations, surfaces 221 and 222 are coated with a highly reflective material (e.g., a reflective metal, such as aluminum or silver), to provide a highly reflective optical interface. The cross-sectional profile of optical coupler 220 can be uniform along the length L of luminaire module 200. Alternatively, the cross-sectional profile can vary. For example, surfaces 221 and/or 222 can be curved out of the x-z plane.

The exit aperture of the optical coupler 220 adjacent upper edge of light guide 231a is optically coupled to edge 231a to facilitate efficient coupling of light from the optical coupler 220 into light guide 230. For example, the surfaces of a solid coupler and a solid light guide can be attached using a material that substantially matches the refractive index of the material forming the optical coupler 220 or light guide 230 or both (e.g., refractive indices across the interface are different by 2% or less.) The optical coupler 220 can be affixed to light guide 230 using an index matching fluid, grease, or adhesive. In some implementations, optical coupler 220 is fused to light guide 230 or they are integrally formed from a single piece of material (e.g., coupler and light guide may be monolithic and may be made of a solid transparent optical material).

FIGS. 2D and 2E show portions of a luminaire module, like the luminaire module 200, in which the LEEs 210 are optically coupled directly to the light guide 230, i.e., without using an optical coupler like the optical coupler(s) 220. Here, the receiving end 231a of the light guide 230 has multiple indentations 234 distributed along the y-axis. For example, in the implementation shown in FIG. 2D, the mount 205 is mechanically coupled with the receiving end 231a of the light guide 230. In this manner, the LEEs 210 are optically coupled with the light guide 230 through respective indentations 234 of the receiving end 231a of the light guide 230. As another example, in the implementation shown in FIG. 2E, the LEEs 210 are spaced apart from the light guide 230, such that the light emitted by the LEEs 210 is provided to the receiving end 231a of the light guide 230 through multiple optical fibers 228. Here, a respective output tip of each of the optical fibers 228 delivers light emitted by the LEEs 210 to a respective indentation 234 of the receiving end 231a of the light guide 230.

Referring again to FIG. 2A, light guide 230 is formed from a piece of transparent material (e.g., glass material such as BK7, fused silica or quartz glass, or a transparent organic plastic, such as polycarbonate or acrylic) that can be the same as or different from the material forming optical couplers 220. Note that the light guide 230 of FIG. 2A, corresponds to the light guide core 134 described in FIG. 1A. Also note that, in FIG. 2A, the light guide 230 is not sandwiched by cladding, the way, in FIG. 1A, the core 134 has been sandwiched by the cladding 136. For this reason, the luminaire modules 200 described in this section are referred to as luminaire modules having light guides without cladding.

The example light guide 230 of FIG. 2A extends over a length L in the y-direction, has a uniform thickness T in the x-direction, and a uniform depth D in the z-direction. The dimensions D and T are generally selected based on the desired optical properties of the light guide (e.g., which spatial modes are supported) and/or the direct/indirect intensity distribution. During operation, light coupled into the light guide 230 from optical coupler 220 (with an angular range 252) reflects off the planar surfaces of the light guide by TIR and spatially mixes within the light guide. The mixing can help achieve illuminance and/or color uniformity, along the y-axis, at the distal portion 231b of the light guide at optical extractor 240. The depth, D, of light guide 230 can be selected to achieve adequate uniformity at the exit aperture (i.e., at end 231b) of the light guide. In some implementations, D is in a range from about 1 cm to about 20 cm (e.g., 2 cm or more, 4 cm or more, 6 cm or more, 8 cm or more, 10 cm or more, 12 cm or more).

In general, optical couplers 220 are designed to restrict the angular range of light entering the light guide 230 (e.g., to within +/−40 degrees) so that at least a substantial amount of the light (e.g., 95% or more of the light) is optically coupled into spatial modes in the light guide 230 that undergoes TIR at the planar surfaces. Light guide 230 can have a uniform thickness T, which is the distance separating two planar opposing surfaces 232a, 232b of the light guide. Generally, T is sufficiently large so the light guide has an aperture at first (e.g., upper) surface 231a sufficiently large to approximately match (or exceed) the exit aperture of optical coupler 220. In some implementations, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the implementation, the narrower the light guide the better it may spatially mix light. A narrow light guide also provides a narrow exit aperture. As such light emitted from the light guide can be considered to resemble the light emitted from a one-dimensional linear light source, also referred to as an elongate virtual filament.

Optical extractor 240 is also composed of a solid piece of transparent optical material (e.g., a glass material or a transparent organic plastic, such as polycarbonate or acrylic) that can be the same as or different from the material forming light guide 230. In the example implementation shown in FIG. 2A, the optical extractor 240 includes redirecting (e.g., flat) surfaces 242 and 244 and curved surfaces 246 and 248. The flat surfaces 242 and 244 represent first and second portions of a redirecting surface 243, while the curved surfaces 246 and 248 represent first and second output surfaces of the luminaire module 200.

Surfaces 242 and 244 are coated with a reflective material (e.g., a highly reflective metal such as aluminum or silver) over which a protective coating may be disposed. For example, the material forming such a coating may reflect about 95% or more of light incident thereon at appropriate (e.g., visible) wavelengths. Here, surfaces 242 and 244 provide a highly reflective optical interface for light having the angular range 252 entering an input end of the optical extractor 232' from light guide 230. As another example, the surfaces 242 and 244 include portions that are transparent to the light entering at the input end 232' of the optical extractor 240. Here, these portions can be uncoated regions (e.g., partially silvered regions) or discontinuities (e.g., slots, slits, apertures) of the surfaces 242 and 244. As such, some light is transmitted in the forward direction (along the z-axis) through surfaces 242 and 244 of the optical extractor 240 in an output angular range 252'. In some cases, the light transmitted in the output angular range is refracted. In this way, the redirecting surface 243 acts as a beam splitter rather than a mirror, and transmits in the output angular range 252' a desired portion of incident light, while reflecting the remaining light in angular ranges 138 and 138'.

In the x-z cross-sectional plane, the lines corresponding to surfaces 242 and 244 have the same length and form an apex or vertex 241, e.g. a v-shape that meets at the apex 241. In general, an included angle (e.g., the smallest included angle between the surfaces 244 and 242) of the redirecting surfaces 242, 244 can vary as desired. For example, in some implementations, the included angle can be relatively small (e.g., from 30° to 60°). In certain implementations, the included angle is in a range from 60° to 120° (e.g., about 90°). The included angle can also be relatively large (e.g., in a range from 120° to 150° or more). In the example implementation shown in FIG. 2A, the output surfaces 246, 248 of the optical extractor 240 are curved with a constant radius of curvature that is the same for both. In an aspect, the output surfaces 246, 248 may have optical power (e.g., may focus or defocus light.) Accordingly, luminaire module 200 has a plane of symmetry intersecting apex 241 parallel to the y-z plane.

The surface of optical extractor 240 adjacent to the lower edge 231b of light guide 230 is optically coupled to the input end 232' of the optical extractor. For example, optical extractor 240 can be affixed to light guide 230 using an index matching fluid, grease, or adhesive. In some implementations, optical extractor 240 is fused to light guide 230 or they are integrally formed from a single piece of material.

The emission spectrum of the luminaire module 200 corresponds to the emission spectrum of the LEEs 210. However, in some implementations, a wavelength-conversion material may be positioned in the luminaire module, for example remote from the LEEs, so that the wavelength spectrum of the luminaire module is dependent both on the emission spectrum of the LEEs and the composition of the wavelength-conversion material. In general, a wavelength-conversion material can be placed in a variety of different locations in luminaire module 200. For example, a wavelength-conversion material may be disposed proximate the LEEs 210, on the input aperture of couplers 220 or on the input aperture of the light guide 231a, adjacent to the redirecting surfaces 242 and 244 of optical extractor 240, on the exit surfaces 246 and 248 of optical extractor 240, and/or at other locations.

The layer of wavelength-conversion material (e.g., phosphor) may be attached to light guide 230 held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed between $R/n$ and $R*(1+n^2)^{(-1/2)}$, where R is the radius of curvature of the light-exit surfaces (246 and 248 in FIG. 2A) of the extractor 240 and n is the index of refraction of the portion of the extractor that is opposite of the wavelength-conversion material as viewed from the reflective surfaces (242 and 244 in FIG. 2A). The support structure may be a transparent self-supporting structure. The wavelength-conversion material diffuses light as it converts the wavelengths, provides mixing of the light and can help uniformly illuminate a surface of the ambient environment.

During operation, light exiting light guide 230 through end 231*b* impinges on the reflective interfaces at portions of the redirecting surface 242 and 244 and is reflected outwardly towards output surfaces 246 and 248, respectively, away from the symmetry plane of the luminaire module. The first portion of the redirecting surface 242 provides light having an angular distribution 138 towards the output surface 246, the second portion of the redirecting surface 244 provides light having an angular distribution 138' towards the output surface248. The light exits the optical extractor through output surfaces 246 and 248. In general, the output surfaces 246 and 248 have optical power, to redirect the light exiting the optical extractor 240 in angular ranges 142 and 142', respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the luminaire module through surfaces 246 and 248 depends on the divergence of the light exiting light guide 230 and the orientation of surfaces 242 and 244.

Surfaces 242 and 244 may be oriented so that little or no light is output by optical extractor 240 in forward, backward or forward and backward directions. In implementations where the luminaire module 200 is attached to a ceiling of a room (e.g., the forward direction is towards the floor) such configurations can help avoid glare and an appearance of non-uniform illuminance.

In general, the light intensity distribution provided by luminaire module 200 reflects the symmetry of the luminaire module's structure about the y-z plane. For example, referring to FIG. 1C, light output in angular range 142' corresponds to the first output lobe 145*a* of the far-field light intensity distribution 101, light output in angular range 142 corresponds to the second output lobe 145*b* of the far-field light intensity distribution 101 and light output (leaked) in angular range 252' corresponds to the third output lobe 145*c* of the far-field light intensity distribution 101. In general, an intensity profile of luminaire module 200 will depend on the configuration of the optical coupler 220, the light guide 230 and the optical extractor 240. For instance, the interplay between the shape of the optical coupler 220, the shape of the redirecting surface 243 of the optical extractor 240 and the shapes of the output surfaces 246, 248 of the optical extractor 240 can be used to control the angular width and prevalent direction (orientation) of the output first 145*a* and second 145*b* lobes in the far-field light intensity profile 101. Additionally, a ratio of an amount of light in the combination of first 145*a* and second 145*b* output lobes and light in the third output lobe 145*c* is controlled by reflectivity and transmissivity of the redirecting surfaces 242 and 244. For example, for a reflectivity of 90% and transmissivity of 10% of the redirecting surfaces 242, 244, 45% of light can be output in the output angular range 142' corresponding to the first output lobe145*a,* 45% light can be output in the output angular range 142 corresponding to the second output lobe145*b,* and 10% of light can be output in the output angular range 252' corresponding to the third output lobe145*c.*

In some implementations, the orientation of the output lobes 145*a*, 145*b* can be adjusted based on the included angle of the v-shaped groove 241 formed by the portions of the redirecting surface 242 and 244. For example, a first included angle results in a far-field light intensity distribution 101 with output lobes 145*a*, 145*b* located at relatively smaller angles compared to output lobes 145*a*, 145*b* of the far-field light intensity distribution 101 that results for a second included angle larger than the first angle. In this manner, light can be extracted from the luminaire module 200 in a more forward direction for the smaller of two included angles formed by the portions 242, 244 of the redirecting surface 243.

Furthermore, while surfaces 242 and 244 are depicted as planar surfaces, other shapes are also possible. For example, these surfaces can be curved or faceted. Curved redirecting surfaces 242 and 244 can be used to narrow or widen the output lobes 145*a*, 145*b*. Depending of the divergence of the angular range 252 of the light that is received at the input end 232' of the optical extractor, concave reflective surfaces 242, 244 can narrow the lobes 145*a*, 145*b* output by the optical extractor 240 (and illustrated in FIG. 1C), while convex reflective surfaces 242, 244 can widen the lobes 145*a*, 145*b* output by the optical extractor 240. As such, suitably configured redirecting surfaces 242, 244 may introduce convergence or divergence into the light. Such surfaces can have a constant radius of curvature, can be parabolic, hyperbolic, or have some other curvature.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, luminaire module 200 can be designed to output light into different output angular ranges 142, 142' from those shown in FIG. 2A. In some implementations, luminaire modules can output light into lobes 145*a*, 145*b* that have a different divergence or propagation direction than those shown in FIG. 1C. For example, in general, the output lobes 145*a*, 145*b* can have a width of up to about 90° (e.g., 80° or less, 70° or less, 60° or less, 50° or less, 40° or less, or less, 20° or less). In general, the direction in which the output lobes 145*a*, 145*b* are oriented can also differ from the directions shown in FIG. 1C. The "direction" refers to the direction at which a lobe is brightest. In FIG. 1C, for example, the output lobes 145*a*, 145*b* are oriented at approx. −130° and approximately +130°. In general, output lobes 145*a*, 145*b* can be directed more towards the horizontal (e.g., at an angle in the ranges from −90° to −135°, such as at approx. −90°, approx. −100°, approx. −110°, approx. −120°, approx. −130°, and from +90° to +135°, such as at approx. +90°, approx. +100°, approx. +110°, approx. +120°, approx. +130°.

The luminaire modules can include other features useful for tailoring the intensity profile. For example, in some implementations, luminaire modules can include diffuse refractive or reflective interfaces, for example, an optically diffuse material that can diffuse light in a controlled manner to aid homogenizing the luminaire module's intensity profile. Furthermore, surfaces 242 and 244 can be roughened or a diffusely reflecting material, rather than a specular reflective material, can be coated on these surfaces. Accordingly, the optical interfaces at surfaces 242 and 244 can diffusely reflect light, scattering light into broader lobes than would be provided by similar structures utilizing specular reflection at these interfaces. In some implementations these surfaces can include structure that facilitates various intensity distributions. For example, surfaces 242 and 244 can each have multiple planar facets at differing orientations. Accordingly, each facet will reflect light into different directions. In some implementations, surfaces 242 and 244 can have structure thereon (e.g., structural features that scatter or diffract light).

Surfaces 246 and 248 need not be surfaces having a constant radius of curvature. For example, surfaces 246 and 248 can include portions having differing curvature and/or can have structure thereon (e.g., structural features that scatter or diffract light). In certain implementations, a light scattering material can be disposed on surfaces 246 and 248 of optical extractor 240.

In some implementations, optical extractor 240 is structured so that a negligible amount (e.g., less than 1%) of the light propagating within at least one plane (e.g., the x-z cross-sectional plane) that is reflected by surface 242 or 244 experiences TIR at light-exit surface 246 or 248. For certain spherical or cylindrical structures, a so-called Weierstrass condition can avoid TIR. A Weierstrass condition is described for a circular structure (i.e., a cross section through a cylinder or sphere) having a surface of radius R and a concentric notional circle having a radius R/n, where n is the refractive index of the structure. Any light ray that passes through the notional circle within the cross-sectional plane is incident on surface of the circular structure and has an angle of incidence less than the critical angle and will exit circular structure without experiencing TIR. Light rays propagating within spherical structure in the plane but not emanating from within notional surface can impinge on the surface of radius R at the critical angle or greater angles of incidence. Accordingly, such light may be subject to TIR and won't exit the circular structure. Furthermore, rays of p-polarized light that pass through a notional space circumscribed by an area with a radius of curvature that is smaller than $R/(1+n^2)^{(-1/2)}$, which is smaller than R/n, will be subject to small Fresnel reflection at the surface of radius R when exiting the circular structure. This condition may be referred to as Brewster geometry. Implementations may be configured accordingly.

Referring again to FIG. 2A, in some implementations, all or part of surfaces 242 and 244 may be located within a notional Weierstrass surface defined by surfaces 246 and 248. For example, the portions of surfaces 242 and 244 that receive light exiting light guide 230 through end 231b can reside within this surface so that light within the x-z plane reflected from surfaces 242 and 244 exits through surfaces 246 and 248, respectively, without experiencing TIR.

Figure 2F:
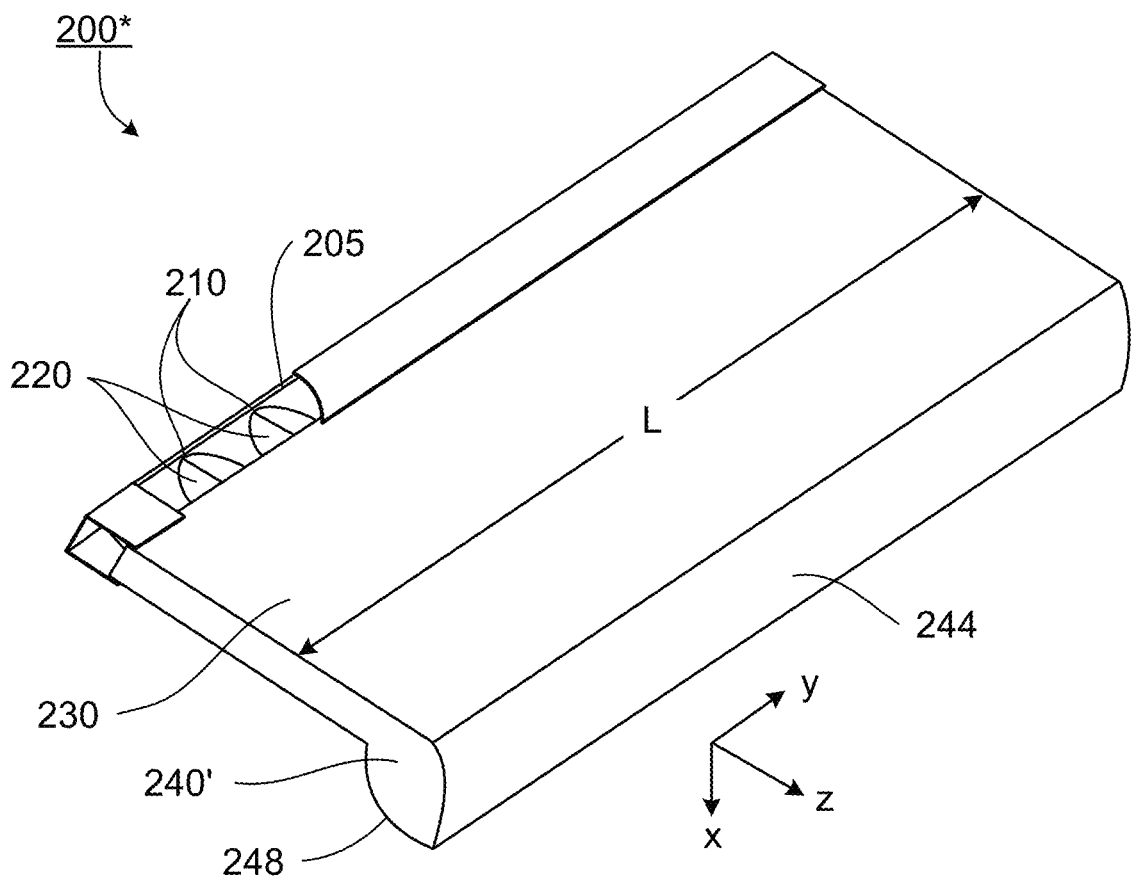

In the example implementations described above in connection with FIG. 2A, the luminaire module 200 is configured to output light into output angular ranges 142 and 142'. In other implementations, the light guide-based luminaire module 200 is modified to output light into a single output angular range 142'. In FIG. 2F, such light guide-based luminaire module configured to output light on a single side of the light guide is referred to as a single-sided luminaire module and is denoted 200*. The single-sided luminaire module 200* is elongated along the y-axis like the luminaire module 200 shown in FIG. 2A. Also like the luminaire module 200, the single-sided luminaire module 200* includes a mount 205 and LEEs 210 disposed on a surface of the mount 205 along the y-axis to emit light in a first angular range. The single-sided luminaire module 200* further includes optical couplers 220 arranged and configured to redirect the light emitted by the LEEs 210 in the first angular range into a second angular range 252 that has a divergence smaller than the divergence of the first angular range at least in the x-z cross-section. Also, the single-sided luminaire module 200* includes a light guide 230 (without cladding) to guide the light redirected by the optical couplers 220 in the second angular range 252 from a first end 231a of the light guide to a second end 231b of the light guide. Additionally, the single-sided luminaire module 200* includes a single-sided extractor (denoted 240') to receive the light guided by the light guide 230. The single-sided extractor 240' includes a redirecting surface 244 to redirect the light received from the light guide 230 into a third angular range 138', like described for luminaire module 200 with reference to FIG. 2A, and an output surface 248 to output the light redirected by the redirecting surface 244 in the third angular range 138' into a fourth angular range 142'.

A light intensity profile of the single-sided luminaire module 200* is represented in FIG. 1C as a single output lobe 145a. The single output lobe 145a corresponds to light output by the single-sided luminaire module 200* in the fourth angular range 142'.

FIG. 2G shows an embodiment 200' of the luminaire module 200 that also is elongated along an axis (e.g., y-axis) perpendicular to the forward direction (e.g., along the z-axis.) In this case, a length L of the light guide 230 along the elongated dimension of the luminaire module 200' can be 2', 4' or 8', for instance. A thickness T of the light guide 230 orthogonal to the elongated dimension L (e.g., along the x-axis) is chosen to be a fraction of the distance D traveled by the guided light from the receiving end to the opposing end of the light guide 230. For T=0.05D, 0.1D or 0.2D, for instance, light from multiple, point-like LEEs 210—distributed along the elongated dimension L—that is edge-coupled into the light guide 230 at the receiving end can efficiently mix and become uniform (quasi-continuous) along the y-axis by the time it propagates to the opposing end.

FIG. 2H shows a luminaire module 200" that has (e.g., continuous or discrete) rotational symmetry about the forward direction (e.g., z-axis.) Here, a diameter T of the light guide 230" is a fraction of the distance D traveled by the guided light from the receiving end to the opposing end of the light guide 230". For example, the diameter of the light guide 230" can be T=0.05D, 0.1D or 0.2D, for instance.

Other open and closed shapes of the luminaire module 200 are possible. FIGS. 2I and 2J show a perspective view and a bottom view, respectively, of a luminaire module 200''' for which the light guide 230''' has two opposing side surfaces 232a, 232b that form a closed cylinder shell of thickness T. In the example illustrated in FIGS. 2I and 2J, the x-y cross-section of the cylinder shell formed by the opposing side surfaces 232a, 232b is oval. In other cases, the x-y cross-section of the cylinder shell can be circular or can have other shapes. Some implementations of the example luminaire module 200''' may include a specular reflective coating on the side surface 232a of the light guide 230'''. For T=0.05D, 0.1D or 0.2D, for instance, light from multiple, point-like LEEs 210—distributed along an elliptical path of length L—that is edge-coupled into the light guide 230''' at the receiving end can efficiently mix and become uniform (quasi-continuous) along such an elliptical path by the time it propagates to the opposing end.

Luminaire modules, e.g., 200, 200*, 200" and 200''', described in this section have light guides, e.g., 230, 230" and 230''', to guide light from each's input end 231a to its output end 231b via TIR off its side surfaces 232a and 232b. Without cleaning or without applying appropriate polishing procedures, the solid light guides, e.g., 230, 230" and 230''', described in this section may be prone to undesired effects when their side surfaces 232a, 232b become contaminated with dust, fingerprints or other dirt or are optically not sufficiently smooth/precisely shaped, for example. Such surface contamination or surface roughness can frustrate TIR and result in undesired light leakage trough the side surfaces 232a, 232b of a light guide, which in turn can negatively affect appearance and aesthetics of the fixture particularly during operation. To mitigate effects of light guide side surface contamination, the luminaire modules described in this section can be modified as described in section (iv) by burying the light guide side surface(s) under cladding having a refractive index smaller than the refractive index of the light guide. Further, to mitigate effects of insufficiently smooth/precisely shaped light guide side surfaces, the luminaire modules described in this section can be modified as described in section (v) by coating the light guide side surface(s) with cladding having a refractive index that matches the refractive index of the light guide.

(IV) Luminaire Including a Light Guide with a First Example of Cladding

Figure 3A:
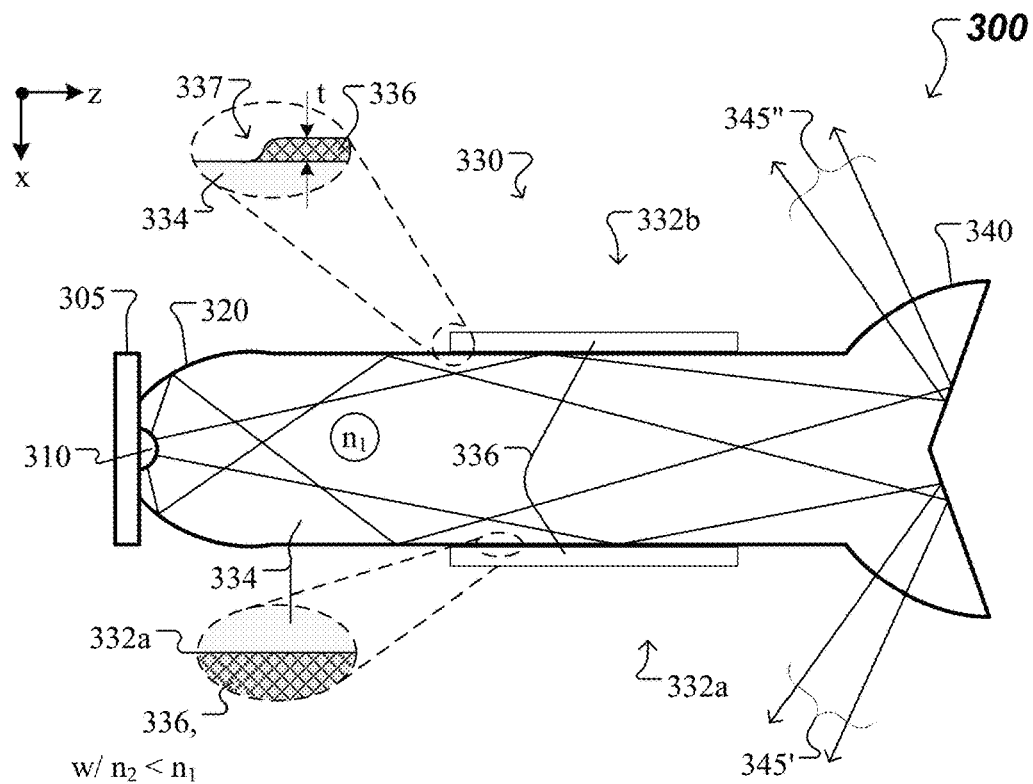
FIGS. 3A-3B show aspects of an example of a luminaire module that includes a light guide with a core and a cladding that sandwiches the core.
Figure 3B:
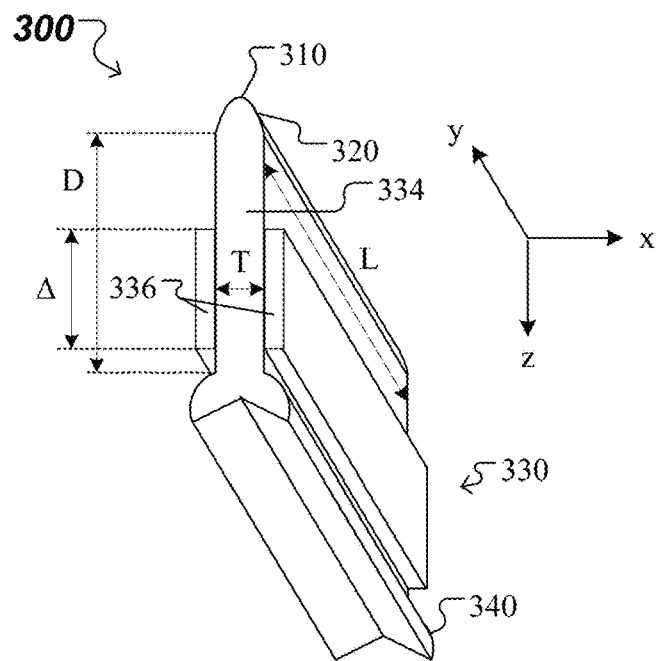

FIGS. 3A-3B show aspects of a luminaire 300 that includes a light guide 330 with a core 334 and cladding 336 that sandwiches the core. Here, the cladding 336 has a smaller refractive index than the core 334.

Moreover, the luminaire 300 also includes a substrate 305, one or more LEE(s) 310 disposed on the substrate, one or more corresponding couplers 320 optically coupled with the LEE(s), and an optical extractor 340. The substrate 305, the LEE(s) 310, the coupler(s) 320, and the optical extractor 340 can have structures similar to corresponding structures of the substrate 205, the LEE(s) 210, the coupler(s) 220, and the extractor 240 of the luminaire module 200 described above in connection with FIGS. 2A-2E.

In the example illustrated in FIGS. 3A-3B, the luminaire 300 has an elongated configuration, e.g., with a longitudinal dimension L along the y-axis, perpendicular to the page. In this case, L can be 1', 2' or 4', for instance. In other implementations, the luminaire 300 can have other elongated configurations, e.g., like the one as illustrated in FIGS. 2I-2G. In some other implementations, the luminaire 300 can have a non-elongated configuration, e.g., with rotational symmetry around the z-axis, as illustrated in FIG. 2H.

The core 334 of the light guide 330 has parallel side surfaces 332a and 332b. Since the luminaire 300 can be configured like any one of the luminaires 200/200', 200*, 200" and 200''' described above in connection with FIGS. 2A and 2F-2J, the core 334 can be shaped like any one of the respective light guides 230, 230', 230" and 230'''. The core 334 has a length D>0 along the z-axis, e.g., D=10, 20, 50 cm, from a receiving end to an opposing end. A thickness T of the core 334 along the x-axis can be much smaller than the length D along the z-axis, e.g., T≈5% D, 10% D or 20% D. The core 334 is made from a solid, transparent material having a first refractive index $n_1$, e.g., in the range $1.4 < n_1 < 2.2$. Here, the side surfaces 332a, 332b are optically smooth to allow for the guided light to propagate inside the core 334 through TIR.

The cladding 336 of the light guide 330 is arranged on the side surfaces 332a and 332b (parallel to the (y,z) plane) of the core 334 to sandwich the core. Moreover, the cladding 336 is arranged over a length Δ of the core 334's length D, where 0<Δ≤D. In some implementations, additional cladding can be arranged on the core 334's side surfaces parallel to the (x,z) plane.

Further, the cladding 336 is made from a solid, (optionally) transparent material having a second refractive index $n_2$, e.g., in the range $1.2 < n_2 < 1.6$. To be able to guide light through TIR off the side surfaces 332a and 332b, the relative refractive index $n_2/n_1$ for guided light at the cladding-core interfaces must satisfy the TIR condition (1), for a given divergence 2θ of the light injected into the core at its receiving end. Alternatively, to be able to guide light through TIR off the side surfaces 332a and 332b, the divergence 2θ of the light injected into the core at its receiving end must satisfy the TIR condition (2) noted above, for a given relative refractive index $n_2/n_1$ for guided light at the cladding-core interfaces. For example, the core 334 may be formed of reasonable pure flint glass having $n_1 \approx 1.61$ or higher, and the cladding 336 may be formed of Polydimethylsiloxane having $n_2 \approx 1.41$. The critical angle (vs normal incidence) for this material combination would be about 61° (i.e., arcsin(1.41/1.61)). In other words, light having a divergence less than +/−29° (i.e., 90°-61° when measured relative to the optical axis of the core 334) will TIR off the side surfaces 332a and 332b. By comparison a light guide without cladding (like the ones described in the previous section) and a refractive index of about 1.5 against air, can accept up to +/−48° (i.e., 90°−arcsin(1/1.5)) divergence.

Furthermore, the cladding 336 has a thickness t in the range of about 1 μm to about 1 mm, or a broader range. The lower bound of the cladding thickness t is related to an evanescent wave depth and to suitably optically confine light that is intended to propagate within the core. The evanescent wave depth is a thickness of the cladding material used by an evanescent wave to propagate along the side surfaces 332a and 332b when the TIR condition (1) or (2) is satisfied. A wall 337 formed at an edge of the cladding 336 can be normal to the side surface of the core 334, or can form an acute angle with the side surface, as illustrated in FIG. 3A.

In some implementations, the thickness t of the cladding 336 can vary along the length Δ of the core 334 onto which the cladding 336 is disposed. In some cases, the thickness of the cladding 336 can increase from a first thickness value t(z) at an end of the cladding 336 proximal to the receiving end of the light guide 330 to a second thickness value t(z+Δ) at an end of the cladding 336 distal from the receiving end, such that t(z+Δ)>t(z). This may be useful for example when using semiconductor claddings to polarize light.

In the example illustrated in FIGS. 3A-3B, the LEEs 310 emit, during operation, light within a first angular range 115 relative to the z-axis. The one or more optical couplers 320 are configured to receive the light from the LEEs 310 within the first angular range 115 and provide light within a second angular range 125 to the core 334 of the light guide 330. Here, the divergence of the second angular range 125 is smaller than the divergence of the first angular range 115, such that the combination (i) of a divergence of the second angular range 125 and (ii) a relative refractive index at the cladding-core interfaces 332a, 332b of the light guide 330 is chosen, based on the TIR conditions (1) or (2), to allow for the light received from the one or more couplers 320 at the receiving end of the light guide 330 to propagate to the opposing end of the light guide 330 via TIR.

At the opposing end, the forward guided light has a third angular range 135. In implementations in which the side surfaces 332a, 332b are parallel to each other, the third angular range 135 is substantially the same as the second angular range 125. At the opposing end, the optical extractor 340 is arranged and configured to output light in first and second output angular ranges 345' and 345". In this example, a direction of propagation of light in the first output angular range 345' has a component in the backward direction (antiparallel with the z-axis) and another component to one side of the light guide 330 (parallel with the x-axis). Further, a direction of propagation of light in the second output angular range 345" has a component in the backward direction (antiparallel with the z-axis) and another component to the opposite side of the light guide 330 (antiparallel with the x-axis). Light output by the optical extractor 340 in the first (second) output angular range 345' (345") corresponds to a first (second) output lobe 145a (145b) of the far-field light intensity profile 101 illustrated in FIG. 1C.

In conclusion, to mitigate effects of surface contamination of the side surfaces 332a, 332b of the core 334 of the light guide 330 of the luminaire module 300, the cladding 336 has been arranged on the side surfaces 332a, 332b. Additionally, in order for the guided light to propagate inside the core 334 through TIR, a combination of a divergence of light received at the receiving end of the core 334, and a relative refractive index at portions of the side surfaces 332a, 332b forming the cladding-core interfaces is chosen so the TIR conditions (1) or (2) are satisfied. In this manner, TIR at the buried cladding-core interfaces is not prone to effects from contamination at the outer surfaces of the cladding. Instead contamination due to dust particles, fingerprints, etc., that occurs at the air-cladding interface, does not affect TIR of the light guided through the core 334. If the luminaire module 300 is to be installed in a low ambient-contamination environment, e.g., an environment with low dust content, in which contamination can result mainly through fingerprints deposited during installation of the luminaire module 300, then the cladding 336 can be arranged on the side surfaces 332a, 332b of the core 334 of the light guide 330 only on regions of the side surfaces 332a, 332b which are designated to be grabbed by installers of the luminaire module 300.

(V) Luminaire Including a Light Guide with a Second Example of Cladding

Figure 4A:
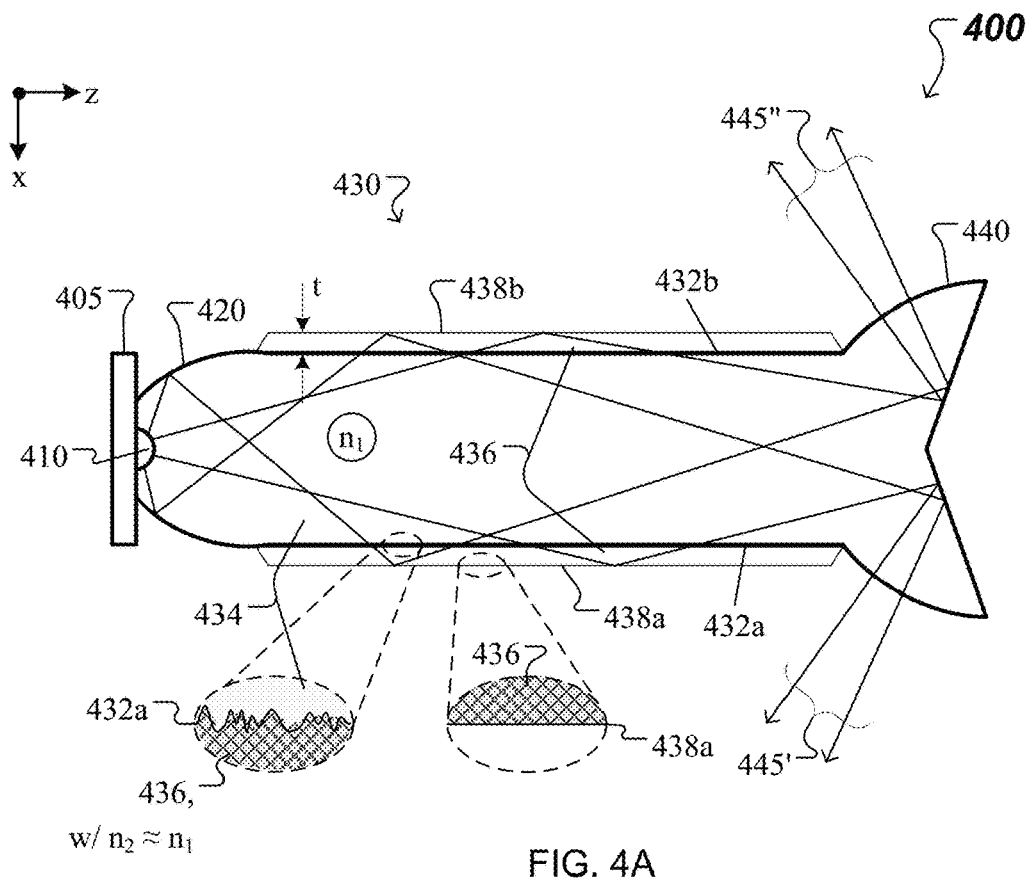
FIGS. 4A-4B show aspects of another example of a luminaire module that includes a light guide with a core and a cladding that sandwiches the core.
Figure 4B:
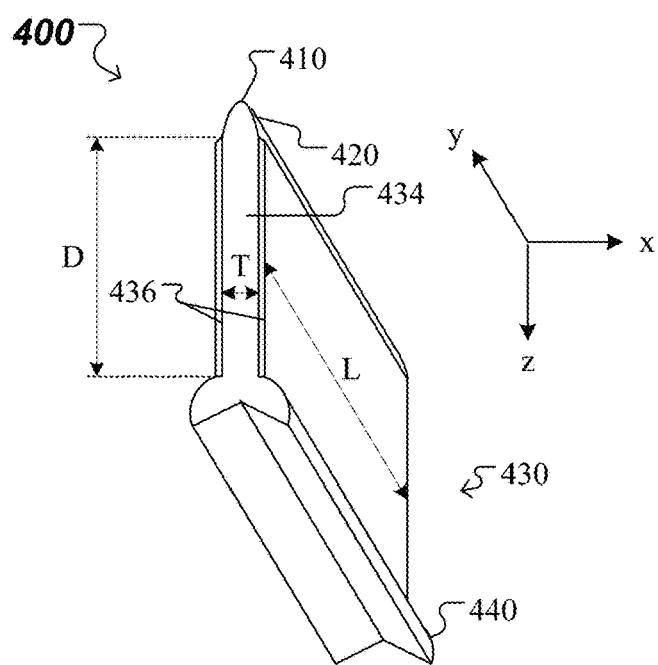

FIGS. 4A-4B show aspects of a luminaire 400 that includes a light guide 430 with a core 434 and cladding 436 that sandwiches the core. Here, the cladding 436 and the core 334 have matching refractive indices.

Moreover, the luminaire 400 also includes a substrate 405, one or more LEE(s) 410 disposed on the substrate, one or more corresponding couplers 420 optically coupled with the LEE(s), and an optical extractor 440. The substrate 405, the LEE(s) 410, the coupler(s) 420, and the optical extractor 440 can have structures similar to corresponding structures of the substrate 205, the LEE(s) 210, the coupler(s) 220, and the extractor 240 of the luminaire module 200 described above in connection with FIGS. 2A-2E.

In the example illustrated in FIGS. 4A-4B, the luminaire 400 has an elongated configuration, e.g., with a longitudinal dimension L along the y-axis, perpendicular to the page. In this case, L can be 1', 2' or 4', for instance. In other implementations, the luminaire 400 can have other elongated configurations, e.g., like the one as illustrated in FIGS. 2I-2G. In some other implementations, the luminaire 400 can have a non-elongated configuration, e.g., with rotational symmetry around the z-axis, as illustrated in FIG. 2H.

The core 434 of the light guide 430 has parallel side surfaces 432a and 432b. Since the luminaire 400 can be configured like any one of the luminaires 200/200', 200\*, 200" and 200'" described above in connection with FIGS. 2A and 2F-2J, the core 434 can be shaped like any one of the respective light guides 230, 230', 230" and 230'". The core 434 has a length D>0 along the z-axis, e.g., D=10, 20, 50 cm, from a receiving end to an opposing end. A thickness T of the core 434 along the x-axis can be much smaller than the length D along the z-axis, e.g., T≈5% D, 10% D or 20% D. The core 434 is made from a solid, transparent material having a first refractive index $n_1$, e.g., in the range $1.2 < n_1 < 2.2$. Here, the side surfaces 432a, 432b are optically rough, such that TIR of light guided inside the core 434 would be frustrated. A metric for characterizing roughness can be rms, and the side surfaces 432a, 432b are called optically rough if $rms_{432} > rms_{th}$, where the threshold $rms_{th}=1, 5, 10, 50, 100$ μm or other values.

For this reason, the cladding 436 of the light guide 430 is arranged on the entire length D of the side surfaces 432a and 432b (parallel to the (y,z) plane) of the core 434 to sandwich the core and to bury the optically rough side surface 432a and 432b. In some implementations, additional cladding can be arranged on the core 434's side surfaces parallel to the (x,z) plane, especially if the latter side surfaces also are optically rough.

Note that in order to render the optically rough side surfaces 432a, 432b "invisible" to the guided light, the cladding 436 is made from another solid, (optionally) transparent material that (i) has a second refractive index $n_2$ that substantially matches the refractive index of the core 434, $n_2 \approx n_1$, and (ii) compliantly conforms to the roughness of the side surfaces 432a, 432b (i.e., it is able to fill all valleys and yield to all peaks associated with the roughness of the side surfaces 432a, 432b). For example, the core 434 may be formed of an acrylic having $n_1 \approx 1.43$, and the cladding 436 may be formed of Polydimethylsiloxane having $n_2 \approx 1.41$.

Further note that to be able to guide light through TIR off the air-cladding interfaces 438a, 438b, the cladding is configured to have the following properties. First, the air-cladding interfaces 438a, 438b are optically smooth, e.g., these interfaces have an $rms_{438} < rms_{th}$. Second, the relative refractive index $1/n_1$ for guided light at the air-cladding interfaces and the divergence 2θ of the light injected into the light guide 430 at its receiving end are related to each other through the following condition $$2\theta \leq 2\left(\frac{\pi}{2} - \arcsin\left(\frac{1}{n_2}\right)\right), \quad (3)$$

where $n_2 \approx n_1$.

Furthermore, the cladding 436 has a thickness t in the range of about 1 μm to about 1 mm, or a broader range. The lower bound of the cladding thickness t is related to a thickness of the cladding material that is at least as large as a (peak-to-valley) range of the roughness of the cladding-core interface, e.g., between $3 \times rms_{432}$ and $6 \times rms_{432}$.

In the example illustrated in FIGS. 4A-4B, the LEEs 410 emit, during operation, light within a first angular range 115 relative to the z-axis. The one or more optical couplers 420 are configured to receive the light from the LEEs 410 within the first angular range 115 and provide light within a second angular range 125 to the light guide 430. Here, the divergence of the second angular range 125 is smaller than the divergence of the first angular range 115, such that the combination (i) of a divergence of the second angular range 125 and (ii) a relative refractive index at the air-cladding interfaces 438a, 438b is chosen, based on the TIR condition (3), to allow for the light received from the one or more couplers 420 at the receiving end of the light guide 430 to propagate to the opposing end of the light guide 430 via TIR.

At the opposing end, the forward guided light has a third angular range 135. In implementations in which the air-cladding interfaces 438a, 438b are parallel to each other, the third angular range 135 is substantially the same as the second angular range 125. At the opposing end, the optical extractor 440 is arranged and configured to output light in first and second output angular ranges 445' and 445". In this example, a direction of propagation of light in the first output angular range 445' has a component in the backward direction (antiparallel with the z-axis) and another component to one side of the light guide 430 (parallel with the x-axis). Further, a direction of propagation of light in the second output angular range 445" has a component in the backward direction (antiparallel with the z-axis) and another component to the opposite side of the light guide 430 (antiparallel with the x-axis). Light output by the optical extractor 440 in the first (second) output angular range 345' (345") corresponds to a first (second) output lobe 145a (145b) of the far-field light intensity profile 101 illustrated in FIG. 1C.

In conclusion, to mitigate effects of roughness of the side surfaces 432a, 432b of the core 434 of the light guide 430 of the luminaire module 400, cladding 436, which has a refractive index that matches the refractive index of the core, was arranged on the side surfaces 432a, 432b over substantially their entire length D. Additionally, in order for the guided light to propagate inside the light guide 430 through TIR, a combination of a divergence of light received at the receiving end of the light guide 430, and a relative refractive index at the air-cladding interfaces 438a, 438b is chosen so the TIR condition (3) is satisfied. In this manner, TIR will occur at the optically smooth air-cladding interfaces 438a, 438b, while the optically rough cladding-core interfaces will be "invisible" to the guided light. Using index-matched cladding on the side surfaces of the core of a light guide can bury surface imperfections and provide a smoother, optically better performing surface with the ambient environment. Depending on the implementation, such a system further can be clad with a second cladding having a lower refractive index than the initial cladding, for example to provide a buried TIR interface as described in the first example above. Likewise, application of claddings with like/identical refractive indices to turn optically rough surfaces into buried interfaces and to provide suitable solid optics with smooth outer surfaces also can be used in the fabrication of the extractor, the couplers or other optical components.

The preceding figures and accompanying description illustrate example methods, systems and devices for illumination. It will be understood that these methods, systems, and devices are for illustration purposes only and that the described or similar techniques may be performed at any appropriate time, including concurrently, individually, or in combination. In addition, many of the steps in these processes may take place simultaneously, concurrently, and/or in different orders than as shown. Moreover, the described methods/devices may use additional steps/parts, fewer steps/parts, and/or different steps/parts, as long as the methods/devices remain appropriate.

In other words, although this disclosure has been described in terms of certain aspects or implementations and generally associated methods, alterations and permutations of these aspects or implementations will be apparent to those skilled in the art. Accordingly, the above description of example implementations does not define or constrain this disclosure. Further implementations are described in the following claims.

What is claimed is:

1. A device comprising:
   a light guide comprising:
      a receiving end and an opposing end separated by a depth of the light guide, the receiving end arranged to receive light, the light guide configured to guide received light in a forward direction along the depth of the light guide toward the opposing end of the light guide;
      a core comprising a transparent core material with a first refractive index, $n_1$, the core having an optically rough side surface extending between the receiving end and the opposing end; and
      a first cladding comprising a transparent first cladding material having a refractive index matching the first refractive index $n_1$ of the core material, the first cladding arranged on the optically rough side surface,
   wherein the device is a luminaire.

2. The device of claim 1, wherein the light guide further comprises a second cladding comprising a second cladding material, the second cladding material having a second refractive index, $n_2$, wherein $n_2 < n_1$, the second cladding being arranged on the first cladding.

3. The device of claim 1, wherein a thickness of the first cladding is larger than a root mean square (RMS) measure of roughness of the optically rough side surface.

4. The device of claim 3, wherein the thickness of the cladding is in a range of 3×RMS to 6×RMS.

5. The device of claim 1, wherein the received light has a divergence 2θ and the first refractive index $n_1$ satisfies the following condition $2\theta \leq 2(\pi/2 - \text{ArcSin}(1/n_1))$.

6. The device of claim 1, wherein the optically rough side surface comprises a curved portion in a plane perpendicular to the forward direction and a straight portion in a plane parallel to the forward direction.

7. The device of claim 1, wherein the optically rough side surface comprises planar side surfaces.

8. The device of claim 7, wherein the planar side surfaces comprise parallel side surfaces.

9. The device of claim 1, wherein the received light is white light emitted from light emitting diodes (LEDs).

10. The device of claim 3, wherein the first cladding has an outer surface opposite the optically rough side surface, and an RMS of the outer surface is smaller than the RMS of the optically rough side surface.

11. The device of claim 1, wherein the light guide has a uniform thickness perpendicular the forward direction.

12. The device of claim 1, wherein the first cladding has a uniform thickness.

13. The device of claim 1, wherein the light guide has a uniform depth.

14. The device of claim 1, wherein the first cladding extends along the full depth of the light guide.

15. The device of claim 2, wherein the received light has a divergence 2θ and the following condition is satisfied $2\theta \leq 2(\pi/2 - \text{ArcSin}(n_2/n_1))$.

* * * * *

UNITED STATES PATENT AND TRADEMARK OFFICE
CERTIFICATE OF CORRECTION

| | | |
|---|---|---|
| PATENT NO. | : 12,085,747 B2 | Page 1 of 1 |
| APPLICATION NO. | : 18/098669 | |
| DATED | : September 10, 2024 | |
| INVENTOR(S) | : Eric Bretschneider and Ferdinand Schinagl | |

It is certified that error appears in the above-identified patent and that said Letters Patent is hereby corrected as shown below:

On the Title Page

Column 2 (Other Publications), Line 3, delete "Internatioanl" and insert --International--.

In the Claims

Column 24, Line 49, In Claim 11, delete "perpendicular" and insert --perpendicular to--.

Signed and Sealed this
Twenty-second Day of October, 2024

*Katherine Kelly Vidal*

Katherine Kelly Vidal
*Director of the United States Patent and Trademark Office*